US005820977A

United States Patent [19]

Shirakura et al.

[11] Patent Number: 5,820,977
[45] Date of Patent: Oct. 13, 1998

[54] SUPPORT FOR PHOTOGRAPHIC PRINTING PAPER COMPRISING SILICONE COATED TITANIUM DIOXIDE PIGMENTS

[75] Inventors: Yuji Shirakura; Hisamasa Abe, both of Shizuoka, Japan

[73] Assignee: Fuji Photo Film Co., Ltd., Kanagawa, Japan

[21] Appl. No.: 681,511

[22] Filed: Jul. 23, 1996

[30] Foreign Application Priority Data

Aug. 4, 1995 [JP] Japan .................................... 7-200099

[51] Int. Cl.[6] ........................................ B32B 5/16

[52] U.S. Cl. .......................... 428/328; 428/405; 428/407

[58] Field of Search .................................... 428/328, 403, 428/407, 405

[56] References Cited

U.S. PATENT DOCUMENTS

| | | | |
|---|---|---|---|
| 4,369,265 | 1/1983 | Buxbaum et al. | 523/212 |
| 4,416,699 | 11/1983 | Jacobson | 106/300 |
| 4,594,315 | 6/1986 | Shibue et al. | 430/531 |
| 4,801,445 | 1/1989 | Fukui et al. | 424/69 |
| 4,818,614 | 4/1989 | Fukui et al. | 428/403 |
| 5,153,068 | 10/1992 | Kohara et al. | 428/405 |
| 5,165,992 | 11/1992 | Yajima | 428/328 |
| 5,360,707 | 11/1994 | Kato et al. | 430/538 |

FOREIGN PATENT DOCUMENTS

| | | | |
|---|---|---|---|
| 0292120 | 11/1988 | European Pat. Off. . | |
| 0586846 | 3/1994 | European Pat. Off. . | |
| 55-154317 | 12/1980 | Japan . | |
| 61-26652 | 6/1986 | Japan | G03C 1/87 |
| 3-275768 | 12/1991 | Japan . | |

OTHER PUBLICATIONS

Database WPI, Section Ch, Week 9519, Derwent Publications Ltd., Class A89, AN 95–141871, for JP–A–07 064 238, Mar. 10, 1995.

Database WPI, Section Ch, Week 8308, Derwent Publications Ltd. Class A89, AN 83–18843k, for JP–A–58 007 630, Jan. 17, 1983.

Database WPI, Section Ch, Week 9226, Derwent Publications Ltd., Class A17, AN 92–213928, for JP–A–04 143 748, May 18, 1992.

Database WPI, Section Ch, Week 8631, Derwent Publications Ltd., Class A17, AN 86–202408, for JP–A–61 136 537, Jun. 24, 1986.

Database WPI, Section Ch, Week 8915, Derwent Publications Ltd., Class A17, AN 89–110679, for JP–A–01 056 749, Mar. 3, 1989.

Database WPI, Section Ch, Week 9416, Derwent Publications Ltd., Class A17, AN 94–132113, for JP–A–06 080 798, Mar. 22, 1994.

*Primary Examiner*—H. Thi Le
*Attorney, Agent, or Firm*—Sughrue, Mion, Zinn, Macpeak & Seas, PLLC

[57] ABSTRACT

In a support for a photographic printing paper, in which water-proof resin layers 2, 3 are formed on both sides of a base 1, one of the water-proof resin layers 2, 3, at a side of an emulsion to be coated, contains titanium dioxide pigment. The surface of particles of the titanium dioxide pigment is treated with a silane coupling agent. Preferably, the surface of titanium dioxide is subjected to surface treatment with an inorganic surface treating agent, and subsequently, is treated with the silane coupling agent. Further, silicone oligomer is preferably used as the silane coupling agent. As a result, a support for a photographic printing paper can be provided which causes no film fractures in the water-proof resin layers and no score lines in a die-lip portion, provides excellent adhesiveness to the base, and is superior in image sharpness.

16 Claims, 3 Drawing Sheets

SUPPORT FOR PHOTOGRAPHIC PRINTING PAPER COMPRISING SILICONE COATED TITANIUM DIOXIDE PIGMENTS

BACKGROUND OF THE INVENTION

1. Field of the Invention

The present invention relates to a support for a photographic printing paper, and particularly to a support for a photographic printing paper in which water-proof resin coating layers are formed on both sides of a base and which is superior in image sharpness (i.e., resolving power) and in a surface characteristic.

2. Description of the Related Art

Conventionally, there has been known a support for a photographic printing paper, of which both sides are coated with resin. Particularly, a coating layer of the support provided on the side of an emulsion to be coated comprises titanium dioxide, pigments, a blueing agent (including blue pigments), a fluorescent brightening agent, and the like (see U.S. Pat. No. 3,501,298).

The titanium dioxide used in this case has a function of improving light reflection efficiency as well as the water-proof property. It has been known that the resolving power improves as an amount of titanium dioxide contained is increased.

On the other hand, the water-proof resin layer is formed in such a manner that a water-proof resin containing titanium dioxide is melt-extruded from a slit die in the shape of a film in a short time. However, when the resin coating layer contains at least 20% by weight of titanium dioxide and is melt-extruded at an extrusion temperature in the range from 290° C. to 350° C. in a conventional manner, fractures are formed in the water-proof resin layer (the fractures will be hereinafter referred to as film fractures), or a score line is apt to be formed in a die lip portion of an extruder (the score line will be hereinafter referred to as die-lip score line).

When such film fractures are formed, not only the appearance of a product is markedly deteriorated, but also the water-proof property is lost, thereby resulting in loss of commercial value of the product. Further, when die lip score lines are caused, continuous streaks are formed on a surface of a manufactured film or a laminated layer in the longitudinal direction. For this reason, not only the appearance of the product is markedly deteriorated, but also unevenness in the transparency of the film occurs even at the time of a secondary process of resin, such as a drawing process. As a result, the commercial value of the product is markedly lowered.

When the extrusion temperature is set at a temperature of less than 290° C. in order to solve the above-described drawbacks, adhesion force between a paper base and the water-proof resin is markedly reduced and the flowability of the molten water-proof resin also deteriorates. Here, when air carried on a cooling roll at the time of extruding and laminating processing enters a nip portion between the cooling roll and a press roll, the air cannot be released and pushes the molten water-proof resin, thereby causing a defect in the shape of a dent on the surface of the water-proof resin. The occurrence of this defect would lead to deterioration in planeness. In addition, a crater is apt to be formed in the water-proof resin layer. Accordingly, a method has been conventionally used in which, at the sacrifice of the resolving power, the content of titanium dioxide is limited to be less than 20% by weight.

On the other hand, recently, there has been developed a support for a photographic printing paper having high resolving power, in which a tackifier resin is applied to a layer containing titanium dioxide and the resultant layer is melt-extruded at an extrusion temperature in the range from 175° C. to 290° C., with the result that the content of titanium dioxide is increased (see PCT International Publication No. WO92/17538).

Further, in Japanese Patent Publication (JP-B) No. 61-26652, there is described a method for manufacturing a photographic coating paper in which polyolefin resin containing titanium dioxide subjected to surface treatment with organopolysiloxane is melt-extruded and a paper is coated with the resin. It is an object of the invention of this publication to prevent deterioration of the quality of a surface of the coating paper due to contamination of a die-lip portion.

In the specification of the above-described Japanese Patent Publication, examples of the organopolysiloxane are dimethylpolysiloxane, dimethylhydrodienesiloxane, and the like. However, these materials do not have coupling groups as end groups thereof and are not silane coupling agents. These materials are compared with the present invention as shown in Comparative Examples 3 and 4 which will be shown later and do not have such an effect as obtained in the silane coupling agent used in the present invention.

The present inventors had studied in detail the above-described support for a photographic printing paper having high resolving power. As a result, it has been revealed that, in this method, not only the dispersibility of titanium dioxide is not sufficient, but also peeling property of the resin layer from the cooling roll after extruding and laminating processing is deteriorated, so that the appearance of the product tends to become inferior.

SUMMARY OF THE INVENTION

The present inventors had diligently studied for reliably manufacturing a support for a photographic printing paper having high resolving power, and as a result, they have found that occurrence of film fractures and die-lip score lines can be influenced by water adsorbed on or bonded to titanium dioxide in a resin composition and that, by using a titanium dioxide pigment in which the surface of titanium dioxide particles to be used is subjected to coating with a silane coupling agent, titanium dioxide pigment in an amount of at least 20% by weight can be easily contained in a polyolefin resin layer. In addition, it has also been found that, even when extrusion molding is performed at a melting temperature of 325° C. or thereabouts, film fractures, die-lip score lines and the like are not caused and adhesiveness is sufficiently maintained, with the result that the present invention has been achieved.

Namely, the present invention is a support for a photographic printing paper, with water-proof resin coating layers being formed on both sides of a base, wherein a titanium dioxide pigment is contained in at least one of the water-proof resin coating layers at a side of an emulsion to be coated and the surface of particles of the titanium dioxide pigment is subjected to coating treatment with a silane coupling agent, and silicone oligomer which will be described later is desirably used as the silane coupling agent.

DESCRIPTION OF THE PREFERRED EMBODIMENTS

Figure 1:
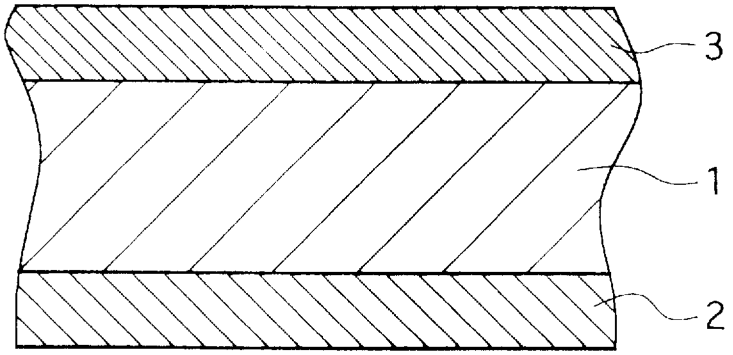
FIG. 1 is a cross-sectional view of a principal portion of a support for a photographic printing paper according to Example 1 of the present invention.

A description will be hereinafter given in detail of a support for a photographic printing paper and a method for manufacturing the same according to the present invention. In the present invention, a coating layer for the surface of a base may be formed as a monolayer or a multilayer (i.e., two-layer, three-layer or more) structure.

The water-proof resin for forming the coating layer of the present invention can be used by appropriately being selected from resins which can be melt-extruded at a temperature in the range of 170° through 345° C. Usually, polyolefin resins such as polyethylene, polypropylene, or the like are used.

Further, any of high density polyethylene (HDPE), low density polyethylene (LDPE), linear low density polyethylene (L-LDPE) and the like may be used as polyethylene. However, when the rigidity of the support for a photographic printing paper is considered as being important, polypropylene, high density polyethylene (HDPE), linear low density polyethylene (L-LDPE), or the like is preferably used.

These resins may be used alone, or combinations thereof may also be used. In the present invention, it is preferable that, in order to obtain excellent image quality, at least one layer of the water-proof resin coating layers on the side of an emulsion to be coated contains an inorganic pigment such as titanium dioxide, a blueing agent, a fluorescent brightening agent, and the like. In order to achieve excellent adhesiveness of the resin layer with a base paper, it is also possible to contain a tackifier resin, an adhesive resin or the like in a lowermost water-proof resin coating layer which contacts the base. Further, an antioxidant, a release agent, a hollow polymer, or the like may also be contained appropriately for other purposes.

The titanium dioxide used in the present invention may be of an anatase or rutile type. When precedence is given to whiteness, anatase titanium dioxide is preferable. When precedence is given to sharpness, rutile titanium dioxide is preferable. Further, when both the whiteness and the sharpness are taken into consideration, the anatase titanium dioxide and the rutile titanium dioxide may be used in a blended manner. Also, in a two-layer structure containing titanium dioxide, the anatase titanium dioxide may be applied to one layer and the rutile titanium dioxide may be applied to the other.

It is preferable that an average particle size of titanium dioxide particles ranges from 0.1 $\mu$m to 0.4 $\mu$m. When the average particle size is smaller than 0.1 $\mu$m, titanium dioxide particles are difficult to be uniformly blended and dispersed in a resin layer, and when the average particle size is larger than 0.4 $\mu$m, the whiteness cannot be sufficiently provided and protuberances are formed on a coating surface with an adverse effect on the image quality.

The titanium dioxide pigment used in the present invention is formed in that the surface of the pigment particles is subjected to coating processing with a silane coupling agent. The silane coupling agent with a terminal group modified with an ethoxy or methoxy group is preferred.

It is preferable that the silane coupling agent is silicone oligomer represented by the following general formula:

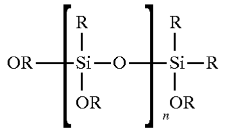

(wherein n represents an integer from 1 to 5, and R represents $CH_3$ or $C_2H_5$.)

A processing amount of the silane coupling agent is preferably in the range from 0.05% to 2.5% by weight relative to titanium dioxide, and more preferably from 0.5% to 2.0% by weight. When the processing amount is smaller than 0.05% by weight, the surface treatment effect by the silane coupling agent is not exhibited. When the processing amount is larger than 2.5% by weight, excess treatment for titanium dioxide is made. As a result, it becomes difficult to contain titanium dioxide in an amount more than 20% by weight in molten polyolefin.

It is preferable that the surface of the titanium dioxide pigment may be subjected to surface treatment with an inorganic surface treating agent before surface treatment with the silane coupling agent, so as to reduce activity of titanium dioxide. The inorganic surface treating agent is preferably at least one of $Al_2O_3$, aluminum oxide, and $SiO_2$, silicon dioxide . The processing amount of the inorganic surface treating agent is preferably in the range from 0.01% to 1.8% by weight relative to the titanium dioxide, and more preferably from 0.2% to 1.0% by weight (when calculated in terms of anhydride form).

Processing with aluminum oxide hydrate, which is one of the important elements in the present invention, will be described hereinafter. The aluminum oxide hydrate herein may have an amorphous form or a crystal form. Although the methods disclosed in U.S. Pat. No. 4,416,699 and Japanese Patent Application Laid-Open (JP-A) Nos. 55-154317 and 3-275768 can be applied to the present invention, methods in which aluminum oxide is not deposited alone and titanium dioxide is reliably coated with aluminum oxide shall be selected. It is important that the amount of aluminum oxide is preferably within the range of 0.1 to 0.7 weight % based on the amount of titanium dioxide. When the amount is less than 0.1 weight %, the catalytic action of the titanium dioxide due to light cannot fully be retarded so that deterioration of resin tends to be promoted with the passage of time, the dispersibility of titanium dioxide in the resin greatly deteriorates, and aluminum oxide cannot be used practically. In contrast, when the amount of aluminum oxide is larger than 0.7 weight % based on the amount of titanium oxide, a synergetic effect with a silicone oligomer, which will be described hereinafter, cannot be obtained, and the laminating fabricating property during a melt-extrusion process deteriorates greatly due to the generation of foam.

As a method of applying a silicone oligomer onto the surface of titanium dioxide, although the silicone oligomer is generally mixed with titanium dioxide or other additives in advance by use of a high speed mixer, the silicone oligomer and titanium dioxide may be kneaded in a thermoplastic resin in advance, or the silicone oligomer may be added when a thermoplastic resin composition containing titanium dioxide is manufactured by kneading.

The thermoplastic resin composition containing titanium dioxide is generally manufactured in such a manner that titanium dioxide, the surface of which has been treated, and the thermoplastic resin are melted and are kneaded by use of a Banbury mixer, a biaxial orientation extruder, a heat roll, a continuous kneading extruder or the like to form a predetermined size of the composition. During the above process, metal soap and the like may be added as a forming aid.

When the surface of titanium dioxide is not treated with the inorganic surface treating agent, the heat resistance of titanium dioxide becomes low. Therefore, when titanium dioxide is used for extruding and laminating processing at a temperature of about 320° C., titanium dioxide may become yellowish. Further, since the activity of titanium dioxide is not reduced, titanium dioxide particles coalesce and are caught by a 20 to 400-mesh filter net made of metal which is generally provided to prevent extrusion of foreign matters in the vicinity of an outlet for extrusion laminating. As a result, there is a possibility that an increase in pressure within an extruding machine be caused.

On the other hand, when the processing amount of the inorganic surface treating agent relative to titanium dioxide is larger than 1.8% by weight, water is apt to adhere to the surface of the inorganic surface treating agent. Thus, when such titanium dioxide is used in the extrusion laminating processing, contamination of the die-lip portion increases extremely quickly. Further, since the film fractures are apt to be caused, it becomes difficult to make the content of titanium dioxide contained in the resin composition to be extrusion-laminated larger than or equal to 20% by weight.

Titanium dioxide is incorporated in the water-proof resin by using a kneading machine such as a two-roll mill, a three-roll mill, a kneader, a Banbury mixer, or continuous kneading, and by using a dispersing agent, of which examples are metal salts of higher fatty acids, higher fatty acid ethyl ester, higher fatty acid amide, higher fatty acids, and polyolefin wax. The resultant water-proof resin containing titanium dioxide pigment is formed in the shape of a pellet and is used as a master batch of titanium dioxide pigment. Particularly, metal salts of stearic acid is preferably used as the dispersing agent, and more preferably, zinc stearate is used.

The concentration of titanium dioxide in the pellet is preferably in the range from 30% to 75% by weight, and the dispersing agent is generally in the range from 0.5% to 10% by weight. When the concentration of titanium dioxide is smaller than 30% by weight, the volume of the pellet increases, and when it is greater than 75% by weight, the dispersibility of titanium dioxide deteriorates and cracks are apt to be formed in the pellet. Further, the master batch containing titanium dioxide is preferably subjected to dry processing or vacuum drying for two hours or more at a temperature in the range from 50° C. to 90° C. before it is used.

The water-proof resin layer on the side of an emulsion to be coated can also contain the blueing agent. Examples of the blueing agent are commonly known ultramarine blue, cobalt blue, cobaltous phosphate, quinacridone pigments, and a mixture thereof. While the particle diameter of the blueing agent is not particularly limited, it is usually in a range from 0.3 to 10 $\mu$m.

A preferable content of the blueing agent used in the multilayer water-proof resin layer according to the present invention is in the range from 0.2% to 0.4% by weight in the uppermost layer and from 0% to 0.15% by weight in a lower layer.

The blueing agent is incorporated in the water-proof resin by using a kneading machine such as a two-roll mill, a three-roll mill, a kneader, a Banbury mixer, continuous kneading, or the like. The resultant water-proof resin containing the blueing agent is formed in the shape of a pellet and is used as the master batch of the blueing agent.

The concentration of the blueing agent in the pellet is preferably in the range from 1% to 30% by weight. When the pellet of the blueing agent is formed, titanium dioxide can be incorporated in the resin. Further, in order to facilitate dispersion of the blueing agent, the dispersing agent such as water-proof resin of low molecular weight, polyolefin wax, metal salts of higher fatty acids, higher fatty acid esters, higher fatty acid amide, higher fatty acids, and the like can be used.

An anti-oxidant may be contained in the water-proof resin coating layer according to the present invention. The content of the anti-oxidant may preferably range from 50 to 1,000 ppm relative to the amount of the water-proof resin. The master batch thus formed containing the titanium dioxide pigment and/or the blueing agent is appropriately diluted with the water-proof resin for use in extruding-lamination.

The above-described tackifier resin is suitably selected from rosin derivative resins, terpene resins (for example, high molecular β-pinene), coumarone-indene resins, petroleum hydrocarbon resins, and the like. These resins may be used alone, or combinations thereof may also be used.

Examples of the above-described petroleum hydrocarbon resins are aliphatic petroleum resins, aromatic petroleum resins, dicyclopentadiene petroleum resins, copolymeric petroleum resins, hydrogenated petroleum resins, and alipha-cyclic petroleum resins. The aliphatic petroleum resins preferably have five carbon atoms, and the aromatic petroleum resins preferably have nine carbon atoms.

The content of the tackifier resin is in the range from 0.5% to 60% by weight relative to the above-described water-proof resin, and preferably from 10% to 35% by weight. When the content of the tackifier resin is smaller than 0.5% by weight, the adhesiveness becomes poor, and when the content of the tackifier resin is larger than 60% by weight, neck-in is apt to occur at the time of manufacturing.

Examples of the adhesive resin which can be heat-fused to the above-described water-proof resin are ionomers, ethylene-vinyl acetate copolymer (EVA), ethylene-acrylic acid copolymer and metal salts thereof. The content of the adhesive resin is in the range from 20% to 500% by weight relative to the above-described water-proof resin, and preferably from 50% to 200% by weight. Further, the tackifier resin and the adhesive resin may be used together.

Next, a monolayer or multilayer water-proof resin layer according to the present invention is formed on a running base such as paper or synthetic resin paper, in such a manner that the pellet containing the titanium dioxide pigment and/or the blueing agent is subjected to heat-melting and is diluted with the water-proof resin if necessary, by any one of regular lamination, successive lamination and other laminations using a monolayer or multilayer extrusion die such as a die employing a feed block, a multi-manifold die, and a die of a multi-slot type. The shape of the monolayer or multilayer extrusion die is not particularly limited, and may be generally a T-shaped die or a coat hanger die.

Before the base is coated with resin, it is preferable that the base is subjected to activating treatment with, for example, corona discharge, flame, glow discharge, or plasma.

For example, when the water-proof resin layer of the present invention has a three-layer structure, it is preferable that the thickness of the uppermost layer is in the range from 0.5 to 50 $\mu$m, that of the intermediate layer is in the range from 5 to 50 $\mu$m, and that of the lowermost layer is in the range from 0.5 to 50 $\mu$m.

The surface of the uppermost layer of the water-proof resin layer on the side of an emulsion to be coated may be a glossy surface, a fine surface disclosed in Japanese Patent Application Laid-Open (JP-A) No. 55-26507 or a matte surface, or may be embossed with "silk" pattern. The backside may be embossed to form a non-glossy surface. The embossed surface may be subjected to activating treatment with, for example, corona discharge or flame. After completion of the activating treatment, undercoating processing as disclosed in Japanese Patent Application Laid-Open (.JP-A) No. 61-846443 may be applied to the surface.

The base used in the present invention may be made from wood pulp containing regular wood pulp as a main component, or may be a blended paper consisting of wood pulp and synthetic fiber, or may be a synthetic fiber paper containing synthetic fiber as a main component, or may be a so-called synthetic paper which is formed with a synthetic resin film such as polystyrene, polyethylene terephthalate, polypropylene, or the like being made like a paper. Particularly, the wood pulp (hereinafter referred to simply as a base paper) is preferably used as the support for a photographic printing paper.

As additives for the base paper, in addition to alkyl ketene dimers, fillers such as clay, talc, calcium carbonate, or fine particles of urea resin, a sizing agent such as rosin, salts of higher fatty acids, paraffin wax, or alkenyl succinic acids, paper strength enhancers such as polyacrylamide, a fixing agent such as sulfate band, and the like are used. Further, dyes, fluorescent dyes, slime control agents, defoaming agents, and the like are added as occasion demands.

Moreover, a softening agent which will be described below can be added if necessary.

A description of the softening agent is, for example, given in "Shin-Paper Processing Handbook (edited by Paper and Chemicals Time)", on pages 554 to 555 (published in 1980), and particularly, the softening agent preferably has a molecular weight of at least 200. The softening agent disclosed therein has a hydrophobic group having at least 10 carbon atoms, and is in the form of amine salt or quaternary ammonium salt which makes auto-fixing for cellulose.

Examples of the softening agent are reaction products of maleic anhydride copolymer and polyalkylene-polyamines, higher fatty acids and polyalkylene-polyamines, and urethane alcohol and an alkylating agent, quaternary ammonium salt of higher fatty acids, and the like. Particularly, reaction products of maleic anhydride copolymer and polyalkylene-polyamines, and urethane alcohol and an alkylating agent are preferably used.

A surface of pulp can be subjected to surface sizing treatment by a film forming polymer such as gelatin, starch, carboxymethylcellulose, polyacrylamide, polyvinyl alcohol, and modified products of polyvinyl alcohol. Examples of modified products of polyvinyl alcohol include modified products with carboxyl group, modified products with silanol, copolymer with acrylamide, and the like. A coating amount of the film forming polymer is adjusted in the range from 0.1 to 5.0 g/$m^2$, and preferably from 0.5 to 2.0 g/$m^2$.

In addition, an antistatic agent, a fluorescent brightening agent, pigments, a defoaming agent, and the like can be added to the above-described film forming polymer if necessary.

The base paper is manufactured in such a manner that the above-described pulp and pulp slurry containing additives such as a filler, a sizing agent, a paper strength enhancer, a fixing agent, and the like, added as occasion demands are made into paper by a paper making machine such as a Fourdrinier paper machine, dried and taken up. Before or after drying, the above-described surface sizing treatment is effected and calendering treatment is effected between the drying process and the take-up process.

When the surface sizing treatment is effected after drying, the calendering treatment can be effected either before and after the surface sizing treatment. However, the calendering treatment is preferably effected in a final finishing step after completion of the above-described various treatments. As a metal roll or a resilient roll used in the calendering treatment, commonly known ones usually used in making paper are used.

The base paper used as the support for a photographic printing paper according to the present invention is finally adjusted to the thickness thereof ranging from 50 to 250 $\mu$m. The density of the base paper is preferably in the range from 0.8 to 1.3 g/$m^3$, and more preferably from 1.0 to 1.2 g/$m^3$.

The support for a photographic printing paper according to the present invention allows various back coating layers to be coated thereon in order to prevent electrostatic charging, curling, or the like. Further, the back coating layer may contain an inorganic antistatic agent, an organic antistatic agent, a hydrophilic binder, latex, a hardening agent, a pigment, a surface-active agent, and a combination thereof, which are disclosed in Japanese Patent Publication (JP-B) Nos. 52-18020, 57-9059, 57-53940, 58-56859, and Japanese Patent Application Laid-Open (JP-A) Nos. 59-214849, 58-184144, and the like.

The support for a photographic printing paper according to the present invention, with various photographic component layers coated thereon, can extensively be used for a color photographic printing paper, a black-and-white photographic printing paper, a photo-composing printing paper, a reversal photographic material, a negative and a positive for silver salt diffusion transfer process, printing materials and the like. For example, a silver chloride emulsion layer, a silver bromide emulsion layer, a silver chloro-bromide emulsion layer, a silver iodo-bromide emulsion layer, or a silver iodo-chloro-bromide emulsion layer can be provided on the support. A silver halide color photographic multilayer comprising silver halide photographic emulsion layers containing color couplers may be provided. Further, an image-receiving layer containing physical development nuclei for a silver salt diffusion transfer process may be provided.

The present invention will be further described in detail with reference to examples which will be described later. However, it should be understood that the present invention is not limited to those particular examples.

[EXAMPLE 1]

A back surface of a paper base (see a reference numeral 1 in FIG. 1) of three meters in width, having an average weight of 169 g/$m^2$, was subjected to corona discharge treatment with an output power of 17 kilowatts of electricity. A polyethylene resin layer (see reference numeral 2 in FIG. 1) of 27 $\mu$m in thickness was formed on the back surface. The resin layer was formed in such a manner that, by using a cooling roll having a surface mat roughness of 10 $\mu$m, a polyethylene resin having a composition shown in Table 1 described below was subjected to multilayer extruding lamination at a melt-extrusion temperature of 333 ° C. and at a line speed of 250 m/min.

TABLE 1

| Layer | Composition | Density (g/$cm^3$) | Amount of Addition (% by weight) | Thickness ($\mu$m) |
|---|---|---|---|---|
| 2 | HDPE | 0.967 | 60 | 27 |
| | LDPE | 0.923 | 40 | |

On a surface of the paper base (see reference numeral 1 in FIG. 1) on the side of an emulsion to be coated, a water-proof resin layer (see reference numeral 3 in FIG. 1)

was formed. The resin layer was provided in such a manner that, by using a cooling roll having a surface mat roughness of 0.7 $\mu$m, a composition shown in Table 2 described below was subjected to extrusion-laminating at a line speed of 250 m/min. Subsequently, the surface on the side of the emulsion to be coated and the back surface were subjected to corona discharge treatments with 18-kilowatt and 12-kilowatt powers, respectively, and the support for a photographic printing paper was thus prepared.

TABLE 2

| Layer | Composition | Amount of Addition (% by weight) | Thickness ($\mu$m) | Resin Temperature (°C.) |
|---|---|---|---|---|
| 3 | LDPE($\rho$ = 0.921 g/cm$^3$) | 67.7 | 28 | 326 |
| | anatase-type $TiO_2$ surface treating amount: ($Al_2O_3$: 0.8% by weight silane coupling agent A: 0.8% by weight) | 30 | | |
| | zinc stearate | 2 | | |
| | ultramarine blue | 0.3 | | |

(wherein, silane coupling agent A is a silicone oligomer of n = 1, R = $CH_3$ in the general formula)

[EXAMPLE 2]

Figure 2:
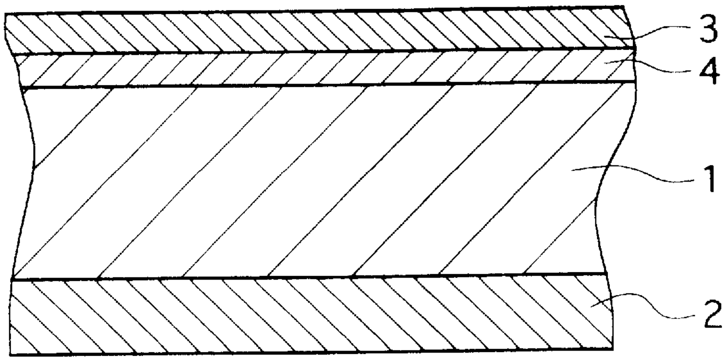
FIG. 2 is a cross-sectional view of a principal portion of a support for a photographic printing paper according to Example 2 of the present invention.

A support for a photographic printing paper was prepared in the same way as in Example 1, except that the compositions of the water-proof resin layers (reference numerals 3 and 4 in FIG. 2) on the side of the emulsion to be coated are replaced by those in Table 3 described below.

TABLE 3

| Layer | Composition | Amount of Addition (% by weight) | Thickness ($\mu$m) | Resin Temperature (°C.) |
|---|---|---|---|---|
| 3 | LDPE($\rho$ = 0.923 g/cm$^3$) | 73.2 | 20 | 323 |
| | anatase-type $TiO_2$ surface treating amount: ($Al_2O_3$: 0.4% by weight silicone oligomer B: 1.0% by weight) | 25 | | |
| | zinc stearate | 1.5 | | |
| | ultramarine blue | 0.3 | | |
| 4 | LDPE($\rho$ = 0.921 g/cm$^3$) | 99.7 | 8 | 335 |
| | ultramarine blue | 0.3 | | |

(wherein, silicone oligomer B is a compound represented by n = 2, R = $CH_3$ in the general formula)

[EXAMPLE 3]

Figure 3:
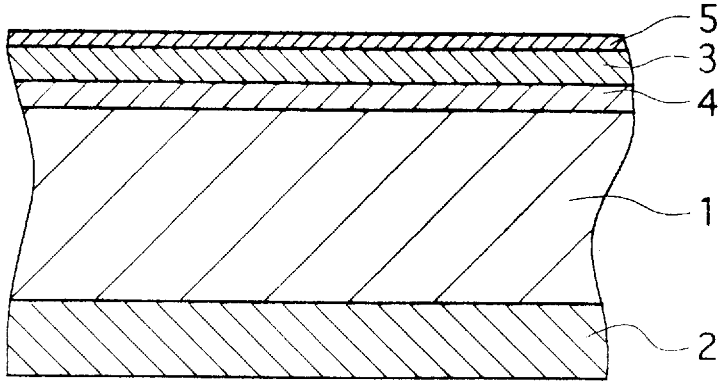
FIG. 3 is a cross-sectional view of a principal portion of a support for a photographic printing paper according to Example 3 of the present invention.

A support for a photographic printing paper was prepared in the same way as in Example 1, except that the compositions of the water-proof resin layers on the side of the emulsion to be coated (reference numerals 3, 4, 5 in FIG. 3) are replaced by those of Table 4 described below.

TABLE 4

| Layer | Composition | Amount of Addition (% by weight) | Thickness ($\mu$m) | Resin Temperature (°C.) |
|---|---|---|---|---|
| 5 | L-LDPE (by Sumitomo Chemical Co., Ltd., CL8071) | 100 | 1 | 300 |
| 3 | LDPE($\rho$ = 0.923 g/cm$^3$) | 63.7 | 8 | 320 |
| | anatase type $TiO_2$ surface processing amount: ($Al_2O_3$: 0.3% by weight silicone oligomer A: 0.4% by weight silicone oligomer B: 0.4% by weight) | 35 | | |
| | zinc stearate | 1 | | |
| | ultramarine blue | 0.3 | | |
| 4 | LDPE($\rho$ = 0.921 g/cm$^3$) | 91.3 | 19 | 328 |
| | anatase type $TiO_2$ surface treating amount: ($Al_2O_3$: 0.4% by weight trimethylol ethane: 0.5% by weight) | 8 | | |
| | zinc stearate | 0.4 | | |
| | ultramarine blue | 0.3 | | |

[EXAMPLE 4]

A support for a photographic printing paper was prepared in the same way as in Example 1, except that the compositions of the water-proof resin layers on the side of the emulsion to be coated (reference numerals 3, 4, 5 in FIG. 3) are replaced by those of Table 5 described below.

TABLE 5

| Layer | Composition | Amount of Addition (% by weight) | Thickness ($\mu$m) | Resin Temperature (°C.) |
|---|---|---|---|---|
| 5 | L-LDPE (by Sumitomo Chemical Co.,Ltd., CL5019) | 100 | 1 | 295 |
| 3 | LDPE($\rho$ = 0.924 g/cm$^3$) | 57.3 | 7 | 325 |
| | anatase type $TiO_2$ surface treating amount: ($Al_2O_3$: 0.5% by weight silicone oligomer C: 1.5% by weight) | 40 | | |
| | zinc stearate | 2.4 | | |
| | ultramarine blue | 0.3 | | |
| 4 | LDPE($\rho$ = 0.923 g/cm$^3$) | 93.3 | 20 | 325 |
| | rutile type $TiO_2$ surface treating amount: ($Al_2O_3$: 0.7% by weight $SiO_2$: 0.8% by weight) | 6 | | |
| | zinc stearate | 0.3 | | |
| | ultramarine blue | 0.3 | | |

TABLE 5-continued

| Layer Composition | Amount of Addition (% by weight) | Thickness (μm) | Resin Temperature (°C.) |
|---|---|---|---|
| fluorescent whitening agent (Whitefluor by Sumitomo Chemical Co., Ltd.) | 0.1 | | |

(wherein, silicone oligomer C is a compound represented by n = 2 and R = $C_2H_5$ in the general formula)

[EXAMPLE 5]

A support for a photographic printing paper was prepared in the same way as in Example 1, except that the compositions of the water-proof resin layer on the side of the emulsion to be coated are replaced by those of Table 6 described below.

TABLE 6

| Layer Composition | Amount of Addition (% by weight) | Thickness (μm) | Resin Temperature (°C.) |
|---|---|---|---|
| 5 L-LDPE (by Mitsui Petrochemical Industries,Ltd., 15101C) | 100 | 1.5 | 290 |
| 3 LDPE(ρ = 0.923 g/cm$^3$) | 62.5 | 8 | 328 |
| rutile type $TiO_2$ surface treating amount: ($Al_2O_3$: 0.7% by weight silicone oligomer A: 0.3% by weight) | 35 | | |
| zinc stearate | 2 | | |
| ultramarine blue | 0.4 | | |
| fluorescent whitening agent (Whitefluor-PSN by Sumitomo Chemical Co., Ltd.) | 0.1 | | |
| 4 LDPE(ρ = 0.921 g/cm$^3$) | 91.2 | 18.5 | 325 |
| anatase type $TiO_2$ surface treating amount: ($Al_2O_3$: 1.7% by weight) | 8 | | |
| zinc stearate | 0.5 | | |
| ultramarine blue | 0.3 | | |

[Comparative Example 1]

A support for a photographic printing paper was prepared in the same way as in Example 1, except that the water-proof resin layer on the side of the emulsion to be coated is replaced by $TiO_2$ described below.

surface treating amount:

($Al_2O_3$:0.4% by weight trimethylol ethane: 0.5% by weight)

[Comparative Example 2]

A support for a photographic printing paper was prepared in the same way as in Example 3, except that $TiO_2$ of the water-proof resin layer 3 on the side of the emulsion to be coated is replaced by $TiO_2$ described below.

anatase-type $TiO_2$ (surface treating amount: $Al_2O_3$0.7% by weight)

[Comparative Example 3]

A support for a photographic printing paper was prepared in the same way as in Example 3, except that $TiO_2$ of the water-proof resin layer 3 at the side of the emulsion to be coated is replaced by $TiO_2$ described below.

anatase-type $TiO_2$ *surface treating amount*: $Al2O_3$0.5% by weight, dimethylpolysiloxane 0.5% by weight)

[Comparative Example 4]

A support for a photographic printing paper was prepared in the same way as in Example 5, except that $TiO_2$ of the water-proof resin layer 3 on the side of the emulsion to be coated is replaced by $TiO_2$ described below.

rutile-type $TiO_2$ *surface treating amount*: $Al2O_3$0.4% by weight, trimethylol ethane 0.5% by weight, dimethylhydrodienesiloxane 0.6% by weight

[Comparative Example 5]

A support for a photographic printing paper was prepared in the same way as in Example 1, except that $TiO_2$ and the resin temperature of the water-proof resin layer 3 on the side of the emulsion to be coated is replaced by those described below.

anatase-type $TiO_2$ surface treating amount: $Al_2O_3$0.50% by weight, trimethylol ethane 0.1% by weight resin temperature: 270° C.

[Comparative Example 6]

A support for a photographic printing paper was prepared in the same way as in Example 3, except that $TiO_2$ of the water-proof resin layer 3 on the side of the emulsion to be coated is replaced by $TiO_2$ described below.

anatase-type $TiO_2$ surface treating amount: $Al_2O_3$0.05% by weight, trimethylol ethane 0.1% by weight

[Comparative Example 7]

A support for a photographic printing paper was prepared in the same way as in Example 1, except that the compositions of the water-proof resin layer on the side of the emulsion to be coated is replaced by those shown in Table 7 described below.

TABLE 7

| Layer Composition | Amount of Addition (% by weight) | Thickness (μm) | Resin Temperature (°C.) |
|---|---|---|---|
| 3 LDPE(ρ = 0.921 g/cm$^3$) | 84.1 | 28 | 326 |
| anatase-type $TiO_2$ surface treating amount: ($Al_2O_3$: 0.3% by weight trimethylol ethane: 0.5% by weight) | 15 | | |
| zinc stearate | 0.6 | | |
| ultramarine blue | 0.3 | | |

Film fractures caused in the water-proof resin layer, score lines due to contamination of the die-lip portion, the adhesiveness of the water-proof resin layer and the base, craters of the water-proof resin layer, an increase in resin pressure when the water-proof resin layer is formed, and the image sharpness of finished prints resulting from the support for a photographic printing paper were examined in the supports for a photographic printing paper prepared as described above. The results thereof are shown in Table 8. Each evaluation of various characteristics shown in Table 8 is indicated by using the following signs.

⊚: the level with the manufacturing fitness or commercial value being excellent.

○: the level with the manufacturing fitness or commercial value being good.

Δ: the level with the manufacturing fitness or commercial value being somewhat undesirable.

×: the level with the manufacturing fitness or commercial value being undesirable.

TABLE 8

| Example/ Comparative Example | Mark of Film Fractures | Score Line due to Contamination of Die-Lip Portion | Adhesiveness to Base | Craters | Increase in Resin Pressure | Sharpness |
|---|---|---|---|---|---|---|
| Example 1 | ⊚ | ○ | ○ | ⊚ | ○ | ○ |
| Example 2 | ⊚ | ○ | ⊚ | ⊚ | ○ | ○ |
| Example 3 | ⊚ | ⊚ | ○ | ○ | ⊚ | ○ |
| Example 4 | ⊚ | ⊚ | ○ | ○ | ○ | ⊚ |
| Example 5 | ⊚ | ⊚ | ○ | ○ | ⊚ | ⊚ |
| Comparative Example 1 | Δ | X | ○ | ⊚ | ○ | ○ |
| Comparative Example 2 | X | ⊚ | ○ | ○ | ○ | ○ |
| Comparative Example 3 | X | ⊚ | ○ | ○ | Δ | ○ |
| Comparative Example 4 | X | ⊚ | ○ | ○ | Δ | ○ |
| Comparative Example 5 | Δ | X | X | X | Δ | ○ |
| Comparative Example 6 | ○ | ⊚ | ○ | ○ | X | ○ |
| Comparative Example 7 | ○ | ○ | ○ | ○ | ○ | Δ |

As clearly seen from Table 8, each example of the support for a photographic printing paper according to the present invention shows the level with the manufacturing fitness or commercial value being excellent or good. On the other hand, when the conventional titanium dioxide is used, each of the above-described comparative examples indicates the level with the manufacturing fitness or commercial value being somewhat undesirable or undesirable in at least one of the above-described characteristics.

As described above, the support for a photographic printing paper according to the present invention causes no increase in resin pressure even when the water-proof resin layer is formed through the melt extrusion at a melting temperature of 325° C. or thereabouts, is excellent in manufacturing fitness, causes no film fractures in the water-proof resin layer, no score lines due to contamination of the die-lip portion, and no craters, provides an excellent adhesiveness of the water-proof resin to the base, and allows titanium dioxide of 20% or more by weight to be contained in the water-proof resin layer. For this reason, an excellent image sharpness of a process ed photographic paper can be obtained by using the support for the photographic printing paper according to the present invention.

What is claimed is:

1. A support for a photographic printing paper, with water-proof resin coating layers being formed on both sides of a base, wherein a titanium dioxide pigment is contained in at least one of the water-proof resin coating layers at a side of an emulsion to be coated and the surfaces of particles of the titanium dioxide pigment are subjected to coating treatment with a silane coupling agent, which is a silicone oligomer represented by the following general formula:

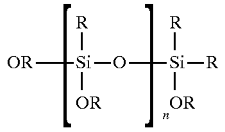

wherein n represents an integer from 1 to 5, and R represents $CH_3$ or $C_2$.

2. A support for a photographic printing paper according to claim 1, wherein said titanium dioxide pigment is treated with an inorganic surface treating agent before treated with the silane coupling agent.

3. A support for a photographic printing paper according to claim 2, wherein said inorganic surface treating agent comprises at least one of $Al_2O_3$ and $Si_2O$.

4. A support for a photographic printing paper according to claim 3, wherein the content of the inorganic surface treating agent is in a range of from 0.01% to 1.8% by weight relative to the titanium dioxide when the inorganic surface treating agent is calculated in terms of anhydride form.

5. A support for a photographic printing paper according to claim 2, wherein the content of the inorganic surface treating agent is in the range of from 0.01% to 1.8% by weight relative to the titanium dioxide when the inorganic surface treating agent is calculated in terms of anhydride form.

6. A support for a photographic printing paper according to claim 1, wherein an amount of the silicone oligomer used for surface treatment is in the range from 0.01% to 5% by weight relative to the titanium dioxide.

7. A support for a photographic printing paper, in which water-proof resin coating layers containing at least one kind of polyolefin resin are formed on both sides of a base, wherein a titanium dioxide pigment is contained in at least one of the water-proof resin coating layers at a side of an emulsion to be coated and the surfaces of particles of the titanium dioxide pigment are subjected to coating treatment with silicone oligomer represented by the general formula,

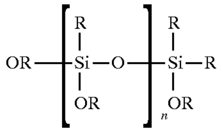

(general formula)

wherein n represents an integer from 1 to 5, and R represents $CH_3$ or $C_2H_5$.

8. A support for a photographic printing paper according to claim 7, wherein said polyolefin resin is a water-proof resin comprising at least one selected from the group consisting of high density polyethylene, low density polyethylene, linear low density polyethylene and polypropylene.

9. A support for a photographic printing paper according to claim 7, wherein said titanium dioxide pigment is formed with the titanium dioxide being treated with an inorganic surface treating agent before treated with the silicone oligomer.

10. A support for a photographic printing paper according to claim 9, wherein said titanium dioxide is dispersed in said polyolefin resin by using a dispersing agent comprising at least one selected from the group consisting of metal salts of higher fatty acids, higher fatty acid esters, higher fatty acid amides, higher fatty acids and polyolefin wax.

11. A support for a photographic printing paper according to claim 10, wherein said polyolefin resin contains a blueing agent comprising one selected from the group consisting of ultramarine blue, cobalt blue, cobaltous phosphate and quinacridone pigments.

12. A support for a photographic printing paper according to claim 11, wherein said titanium dioxide pigment is treated with an inorganic surface treating agent before treated with the silicone oligomer.

13. A support for a photographic printing paper according to claim 12, wherein an amount of the silicone oligomer used for surface treatment is in the range from 0.01% to 5% by weight relative to the titanium dioxide.

14. A support for a photographic printing paper according to claim 13, wherein said inorganic surface treating agent comprises at least one of $Al_2O_3$ and $Si_2O$.

15. A support for a photographic printing paper according to claim 14, wherein the content of the inorganic surface treating agent is in the range of from 0.01% to 1.8% by weight relative to the titanium dioxide when the inorganic surface treating agent is calculated in terms of anhydride form.

16. A support for a photographic printing paper according to claim 9, wherein the content of the inorganic surface treating agent is in the range of from 0.01% to 1.8% by weight relative to the titanium dioxide when the inorganic surface treating agent is calculated in terms of anhydride form.

* * * * *